(12) United States Patent
Zhang et al.

(10) Patent No.: US 12,022,820 B1
(45) Date of Patent: Jul. 2, 2024

(54) INTEGRATED INSECT CONTROL SYSTEM

(71) Applicants: Selina S Zhang, Annandale, NJ (US); Kevin J Zhang, Annandale, NJ (US)

(72) Inventors: Selina S Zhang, Annandale, NJ (US); Kevin J Zhang, Annandale, NJ (US)

(*) Notice: Subject to any disclaimer, the term of this patent is extended or adjusted under 35 U.S.C. 154(b) by 0 days.

(21) Appl. No.: 18/484,467

(22) Filed: Oct. 11, 2023

(51) Int. Cl.
*A01M 1/22* (2006.01)
*A01M 1/02* (2006.01)
*A01M 1/04* (2006.01)

(52) U.S. Cl.
CPC .............. *A01M 1/223* (2013.01); *A01M 1/02* (2013.01); *A01M 1/026* (2013.01); *A01M 1/04* (2013.01); *A01M 2200/012* (2013.01)

(58) Field of Classification Search
CPC ........ A01M 1/223; A01M 1/226; A01M 1/22; A01M 1/02; A01M 1/023; A01M 1/026; A01M 1/04; A01M 1/103; A01M 1/10; A01M 1/12; A01M 1/18; A01G 13/105
USPC .......... 43/112, 107, 113, 132.1, 108
See application file for complete search history.

(56) References Cited

U.S. PATENT DOCUMENTS

| | | | | |
|---|---|---|---|---|
| 8,424,239 B1 * | 4/2013 | Gallo | ...................... | A01M 1/223 43/112 |
| 10,524,461 B1 * | 1/2020 | Files | ...................... | G01S 13/888 |
| 11,596,137 B2 * | 3/2023 | Horning | ................ | A01M 1/106 |
| 11,877,571 B1 * | 1/2024 | Alhuwaidi | ............ | A01M 1/023 |
| 2006/0150470 A1 * | 7/2006 | Ronnau | ................ | H04M 11/002 43/132.1 |
| 2014/0169138 A1 * | 6/2014 | Lee | ........................ | A01M 1/24 43/2 |
| 2014/0226860 A1 * | 8/2014 | Hyde | .................... | A01M 1/026 382/103 |

(Continued)

FOREIGN PATENT DOCUMENTS

| | | | |
|---|---|---|---|
| CN | 213756344 U | * | 7/2021 |
| CN | 216438352 U | * | 5/2022 |

(Continued)

OTHER PUBLICATIONS

PennState Extension, Swackhamer, Emelie et al., "How to Build a Spotted Lanternfly Circle Trap", Apr. 2021; Available web site: https://extension.psu.edu/how-to-build-a-spotted-lanternfly-circle-trap; downloaded on Feb. 9, 2024. (Year: 2021).*

*Primary Examiner* — Darren W Ark
(74) *Attorney, Agent, or Firm* — Jun He Law Offices P.C; Yi Zhang (57) ABSTRACT

The present disclosure provides a pest control device, crafted to mimic a tree, amalgamates physical, chemical, and biological lures, including light, ultrasound, infrared, and specific chemicals, to efficiently attract target insects. Periodically, the device photographs a set area, such as the trunk of the faux tree, equipped with electrified nets. Leveraging a pre-trained machine learning processor, the system detects the presence of specific insect species within these images. Upon identifying a target insect, an electric shock is released in the respective area, neutralizing the insect. The device also features a system to collect and process the insect remnants. Furthermore, these artificial trees can be interconnected to form a network, utilizing big data and machine learning, thereby enabling the formulation of optimal strategies for pest control across specific geographical regions.

8 Claims, 7 Drawing Sheets

(56) References Cited

U.S. PATENT DOCUMENTS

| | | | | |
|---|---|---|---|---|
| 2014/0311014 | A1* | 10/2014 | Feugier | A01M 1/026 43/107 |
| 2015/0335004 | A1* | 11/2015 | Gale | A01M 1/2022 43/132.1 |
| 2016/0110973 | A1* | 4/2016 | Cho | A01M 1/026 348/143 |
| 2016/0235050 | A1* | 8/2016 | Janét | A01M 1/14 |
| 2017/0006848 | A1* | 1/2017 | Barroso | A01M 1/04 |
| 2017/0142953 | A1* | 5/2017 | Carver | A01M 1/103 |
| 2017/0249512 | A1* | 8/2017 | Mcclatchie | A01G 23/00 |
| 2017/0273291 | A1* | 9/2017 | Yoo | G06V 10/141 |
| 2017/0354135 | A1* | 12/2017 | Ching | A01M 1/106 |
| 2018/0054981 | A1* | 3/2018 | Work | A01M 29/12 |
| 2018/0206472 | A1* | 7/2018 | Maxik | A01M 1/06 |
| 2018/0274294 | A1* | 9/2018 | Hoffman | A01M 1/24 |
| 2018/0279598 | A1* | 10/2018 | Hur | A01M 1/106 |
| 2019/0239498 | A1* | 8/2019 | Moore | G08B 21/00 |
| 2019/0281805 | A1* | 9/2019 | Jaffrey | A01M 29/12 |
| 2020/0170234 | A1* | 6/2020 | Dlamini | G16H 40/67 |
| 2020/0178511 | A1* | 6/2020 | Tang | G06V 20/52 |
| 2020/0245604 | A1* | 8/2020 | CHerukumalli | A01M 1/106 |
| 2020/0250482 | A1* | 8/2020 | Lee | G06V 20/20 |
| 2020/0260717 | A1* | 8/2020 | Rose | A01M 1/226 |
| 2021/0007342 | A1* | 1/2021 | Hinsch | G01J 1/0403 |
| 2021/0008756 | A1* | 1/2021 | Geelhoed | A01M 1/226 |
| 2021/0045297 | A1* | 2/2021 | Bergey | A01G 13/02 |
| 2021/0051864 | A1* | 2/2021 | Washko | A01G 13/105 |
| 2021/0209352 | A1* | 7/2021 | Fryshman | A01M 21/043 |
| 2021/0251209 | A1* | 8/2021 | Benedek | A01M 1/06 |
| 2021/0315192 | A1* | 10/2021 | Wiesenberg | A01M 1/226 |
| 2021/0329902 | A1* | 10/2021 | Acharya | A01M 1/106 |
| 2021/0360204 | A1* | 11/2021 | Wollenhaupt | A01M 1/026 |
| 2021/0400943 | A1* | 12/2021 | Cherukumalli | A01M 1/106 |
| 2022/0104474 | A1* | 4/2022 | Chellappan | H04R 1/08 |
| 2022/0159943 | A1* | 5/2022 | Schwerte | G02B 27/126 |
| 2022/0211022 | A1* | 7/2022 | Horning | A01M 1/103 |
| 2022/0217962 | A1* | 7/2022 | Romanova | A01M 1/106 |
| 2022/0283022 | A1* | 9/2022 | Ooi | G01N 29/2418 |
| 2022/0304291 | A1* | 9/2022 | Tabic | A01K 67/033 |
| 2022/0361471 | A1* | 11/2022 | Patch | H04N 7/188 |
| 2023/0064467 | A1* | 3/2023 | Fryers | A01M 1/026 |
| 2023/0160743 | A1* | 5/2023 | Ashry | G01H 9/004 73/655 |
| 2023/0189780 | A1* | 6/2023 | Barlow | A01M 31/002 43/114 |
| 2023/0210101 | A1* | 7/2023 | Nguyen | G06V 10/82 43/132.1 |
| 2023/0210102 | A1* | 7/2023 | Gan | A01M 1/223 43/113 |
| 2023/0225262 | A1* | 7/2023 | Gallardo Pinto | A01M 1/223 47/32.5 |
| 2023/0270097 | A1* | 8/2023 | Brey | A01M 1/026 43/113 |
| 2024/0016136 | A1* | 1/2024 | Peñaloza González | A01N 61/02 |

FOREIGN PATENT DOCUMENTS

| | | | | |
|---|---|---|---|---|
| CN | 114766445 | A | * 7/2022 | A01M 1/02 |
| CN | 216952859 | U | * 7/2022 | |

* cited by examiner

Overview of the equipment

FIG. 3A

Release of incense

INTEGRATED INSECT CONTROL SYSTEM

FIELD OF THE INVENTION

The present invention generally relates to an integrated insect control system. More particularly, the invention relates to an insect pest control device and uses thereof, and methods of controlling an insect pest, e.g., spotted lanternfly.

BACKGROUND OF THE INVENTION

The spotted lanternfly (*Lymcorma delicatula*) is an invasive pest. It has the potential to significantly damage trees and crops, and greatly impact related industries such as orchards and logging. Infested trees develop wounds as the insects extract vital nutrients from the trees and leave toxins behind. Spotted lanternfly visitation not only promotes the growth of destructive sooty mold but also leaves the tree susceptible to disease and harmful pests, as the sap and honeydew excrement potentially attracts other insects. Therefore, the lanternfly needs to be exterminated in its nonindigenous habitat.

However, the lanternfly is difficult to kill. One approach, advocated by the Department of Natural Resources of Pennsylvania involves knocking the insects to the ground and stomping on them. Unfortunately, the lanternfly is capable of flight, enabling it to evade. If one attempts to physically step on or crush a spotted lanternfly, the bug often takes flight immediately, traveling several feet away. Thus, knocking lanternflies down and stepping on them in mass quantities is simply not practical.

Another approach of exterminating these insects involves the use of powerful insecticides. For example, Multicide Wasp & Hornet Spray 20863, Dinotefuran, and Permethrin have been shown to be effective. Though effective, these insecticides pose environmental risks, in particular when used in large quantities. Dinotefuran, for example, has been shown to be detrimental to bees, perhaps contributing to the collapse of bee colonies. Additionally, these insecticides typically require a licensed professional to apply and need a period of time for the toxin to take effect. For example, Dinotefuran takes hours to kill the lanternfly. Moreover, few organic-produce safe pesticides exist, severely limiting organic farmers' options in defending against the spotted lanternfly.

Therefore, an easily deployable, manageable, and environmentally-friendly solution is needed for combatting against the spotted lanternfly. The present invention fulfills this need, among others.

BRIEF SUMMARY OF THE INVENTION

In one aspect, the present disclosure provides an insect pest control device. In some embodiments, the insect pest control device comprises: a tree-shape structure comprising a trunk and a canopy at the top end of the trunk; an electric netting wrapping around the trunk, wherein the electric netting comprises multiple zones configured to release electric shock separately; a vision sensor configured to detect presence of an insect pest at a specific zone of the electric netting; and a controller configured to release an electric shock at the specific zone to kill the insect pest.

In some embodiments, the trunk has a length of around 1.5 meters.

In some embodiments, the insect pest control device further comprises a solar panel installed atop the canopy.

In some embodiments, the insect pest control device further comprises means for attracting the insect pest. In some embodiments, the means for attracting the insect pest is a spray linked to the trunk configured to release chemical or bio-attractant. In some embodiments, wherein the means for attracting the insect pest is configured to emit a light of specific frequency attracting the insect pest. In some embodiments, wherein the light is infrared. In some embodiments, wherein the means for attracting the insect pest is configured to emit ultrasonic waves to lure the insect pest.

In some embodiments, wherein the vision sensor comprises a camera. In some embodiments, wherein the vision sensor further comprises a processor configured to analyze images taken by the camera using a machine learning system to differentiate and identify the insect pest.

In some embodiments, the insect pest control device comprises a recycling bin situated at the base of the trunk which is configured to collect the insect pest being killed.

In some embodiments, the controller is installed inside the trunk. In some embodiments, wherein the controller comprises a single-board computer.

In some embodiments, the insect pest is a planthopper. In some embodiments, the insect pest is a spotted lanternfly.

In another aspect, the present disclosure provides a method of controlling an insect pest. In some embodiments, the method comprises: obtaining the insect pest control device as disclosed herein; detecting presence of an insect pest at a specific zone of the electric netting; and releasing an electric shock at the specific zone to kill the insect pest.

It should be understood that both the foregoing general description and the following detailed description are exemplary and explanatory only, and do not intend to limit the disclosure.

BRIEF DESCRIPTION OF THE FIGURES

The following drawings form part of the present specification and are included to further demonstrate certain aspects of the present disclosure. The disclosure may be better understood by reference to one or more of these drawings in combination with the detailed description of specific embodiments presented herein.

Through the above accompany drawings, the specific embodiments of the disclosure have been illustrated, and a more detailed description may be given as below. These drawings and the textual description are not intended to limit the scope of the concept of the disclosure in any manner, but to explain the concept of the disclosure to those skilled in the art with reference to particular embodiments.

DETAILED DESCRIPTION OF THE INVENTION

In the Summary of the Invention above and in the Detailed Description of the Invention, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Where a range of value is provided, it is understood that each intervening value, to the tenth of the unit of the lower limit unless the context clearly dictate otherwise, between the upper and lower limit of that range and any other stated or intervening value in that stated range, is encompassed within the disclosure, subject to any specifically excluded limit in the stated range. Where the stated range includes one or both of the limits, ranges excluding either or both of those included limits are also included in the disclosure.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, the embodiments described herein can be practiced without their specific details. In other instances, methods, procedures and components have not been described in detail so as not to obscure the related relevant function being described. Also, the description is not to be considered as limiting the scope of the implementations described herein. It will be understood that descriptions and characterizations of the embodiments set forth in this disclosure are not to be considered as mutually exclusive, unless otherwise noted.

Definition

The following definitions are used in the disclosure:

It is understood that as used herein and in the appended claims, the singular forms "a," "an," and "the" include the plural reference unless the context clearly dictates otherwise. Thus, for example, a reference to a "bridge probe" is a reference to one or more bridge probes, and includes equivalents thereof known to those skilled in the art and so forth.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 4 to 20 nucleotides means a range whose lower limit is 4 nucleotides, and whose upper limit is 20 nucleotides.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Insect Pest Control Device

Planthoppers are insects in the infraorder Fulgoromorpha, whose name comes from their remarkable resemblance to leaves and other plants of their environment. Planthoppers often "hop" for quick transportation in a similar way to that of grasshoppers. Planhoppers are plant-feeders, though only a few are considered pests, which includes spotted lanternflies.

The spotted lanternfly is a planthopper indigenous to parts of China and Vietnam and has spread invasively to the United States. The spotted lanternfly was first recorded in the United States in 2014, and as of 2022, it is an invasive species in much of Northeastern United States and is rapidly spreading south and west. The spotted lanternfly infests economically significant plants including soybean, grapes, stone fruits and Malus spp. Ongoing pest control efforts have sought to limit population growth of the spotted lanternfly, due to its threat to global agriculture industries.

Traditional methods of combatting against the spotted lanternfly are difficult to deploy and manage, or not environmentally friendly, due to e.g., the lanternflies' ability of agile flight and the environmental risks of the insecticides. The present disclosure in one aspect provides an insect pest control device which fulfills the needs for efficiently combatting against the spotted lanternfly.

General Structure

The insect pest control device of the present disclosure is designed to resemble a tree-shape structure to increase its attractivity to the pest insects, e.g., the spotted lanternfly, which can be attracted to tall vertical structures.

As used herein, the term "tree-shape structure" refers to a tall vertical structure comprising a trunk and a canopy at the top end of the trunk. In some embodiments, the trunk has a length of around 1.0 meters, 1.1 meters, 1.2 meters, 1.3 meters, 1.4 meters, 1.5 meters, 1.6 meters, 1.7 meters, 1.8 meters, 1.9 meters, 2.0 meters or higher. In certain embodiments, the trunk has a length of around 1.5 meters.

In some embodiments, the insect pest control device comprises solar panels atop the canopy for harvesting solar energy to power the system. In some embodiments, the insect pest control device comprises special electric net wrapped around the trunk to allow targeted electric shock at specific zone(s). In some embodiments, the insect pest control device comprises a controller configured to release an electric shock at the specific zone to kill the insect pest, which can be installed inside the trunk.

Generally, the insect pest control device comprises several basic functional components with the basic mechanisms, including attraction component, identification component, elimination component, recycling component, and control component, together making the whole device working efficiently to combat against the specific insect.

Attraction Component

In some embodiments, the insect pest control device comprises an attraction component, which is based on the mechanism of chemical/biological attractions, light attraction, ultrasound attraction, or infrared attraction.

In some embodiments, the attraction component comprises specific chemicals or bio-attractants stored in an incense source that are periodically or continuously released to attract targeted pests. In certain embodiments, the incense source locates beneath the canopy and releases incense upwards which is attractive to the targeted pests. In certain embodiments, the incense source locates at the summit of the tree, directly beneath the canopy's center.

As used herein, the term "bio-attractant" refers to an attractant that is collected from a part of, or comprises an agent extracted from, organisms emitting a scent that attracts the pests. In some embodiments, the organism is Tree of Heaven (*Ailanthus altissima*). In certain embodiments, the bio-attractant is a branch of Tree of Heaven. In some embodiments, the bio-attractant comprises the extract from the Tree of Heaven.

In some embodiments, the attraction component is a light attraction system using specific light frequencies which are attractive to the targeted pests. In certain embodiments, the attraction component is an ultrasound attraction system which emits ultrasonic waves to lure the targeted pests. In certain embodiments, the attraction component emits sensitivity-based infrared to attract the targeted pests.

Identification Component

In some embodiments, the insect pest control device comprises an identification component, which is able to identify an insect, preferably a targeted pest, within a preset zone (e.g., controlled areas). In some embodiments, the targeted pest is a spotted lanternfly. In some embodiments, the identification component is based on the mechanism of image acquisition and analysis.

In some embodiments, the identification component comprises an image acquisition part and an image analysis part. In certain embodiments, the identification component comprises several high-resolution cameras which focus on the controlled areas, capturing periodic images. In certain embodiments, the identification component comprises two high-resolution cameras located at both sides of the canopy for capturing a 360-degree perspective range. In certain embodiments, the identification component further comprises a processor with machine learning system, which conducts analysis of the captured images by a pre-trained machine learning system to differentiate and identify insects for targeted elimination. Machine learning methods and systems for identifying specific object, e.g., a targeted insect, are known in the art. For example, neural techniques, such as convolutional neural networks (CNN), are able to do object detection without specifically defining features. Alternatively, neural-based approaches can be used to define features in images, then using a non-neural technique, such as support vector machine (SVM) to do the classification.

In certain embodiments, the identification component acquires the image of the insect on the net by cameras, and by the processor with machine learning system, collects the precise location information (e.g., the Cartesian xy coordination using the x and y axes) of the identified insect.

Elimination Component

In some embodiments, the insect pest control device comprises an elimination component, working in a coordinated manner with the identification component.

In some embodiments, the elimination component comprises electric nets all over the controlled areas. In certain embodiments, the cameras for capturing periodic images are synchronized with the electric net's coordinates, allowing for precise targeting of zones using the x and y axes.

Upon positive identification, electric shocks from the electric netting are precisely dispatched to designated areas of the net, resulting in instant neutralization.

Recycling Component

In some embodiments, the insect pest control device comprises a recycling component, for collecting the deceased insects. In certain embodiments, the recycling component is a recycling bin, optionally situated at the base of the trunk, the lid of which is controlled by an electric motor and opens at predetermined intervals.

In some embodiments, the recycling component collects the deceased insects produced by the insect pest control device, potentially be repurposed as feed for poultry. In some embodiments, the deceased insects can be repurposed as chicken feed.

Control Component

In some embodiments, the insect pest control device comprises a control component, which is for governing the entire device and comprises a computer, preferably a microcomputer.

In some embodiments, the insect pest control device also collects the data of temperature, humidity, incense concentration in the surrounding, and the count of pest occurrence, using a sensor and a camera. In some embodiments, the control component of the device analyzes the optimal incense concentration by an AI model, and adjusts the incense concentration by controlling the incense release module.

In certain embodiments, the control component is Raspberry Pi, with electric relays managing each individual subsystem. In certain embodiments, the Raspberry Pi can be operated via an app using Bluetooth connectivity. In certain embodiments, the control component allows for remote management via computers, facilitating data uploads, remote operations, and system updates, by incorporating a 5G or Wi-Fi module.

Exemplary Embodiments

In the following, more detailed description may be given to exemplary embodiments, examples of which are illustrated in the accompany drawings. Where an accompany drawing is referred in the following description, the same number indicates same or similar elements in different accompany drawings, unless specified otherwise. The embodiments described in the following exemplary embodiments do not represent all of the embodiments in consistent with the present disclosure. On the contrary, they are only examples of apparatuses, terminal devices, servers and methods in consistent with some aspects of the present disclosure, as set forth in the appended claims.

Figure 1:
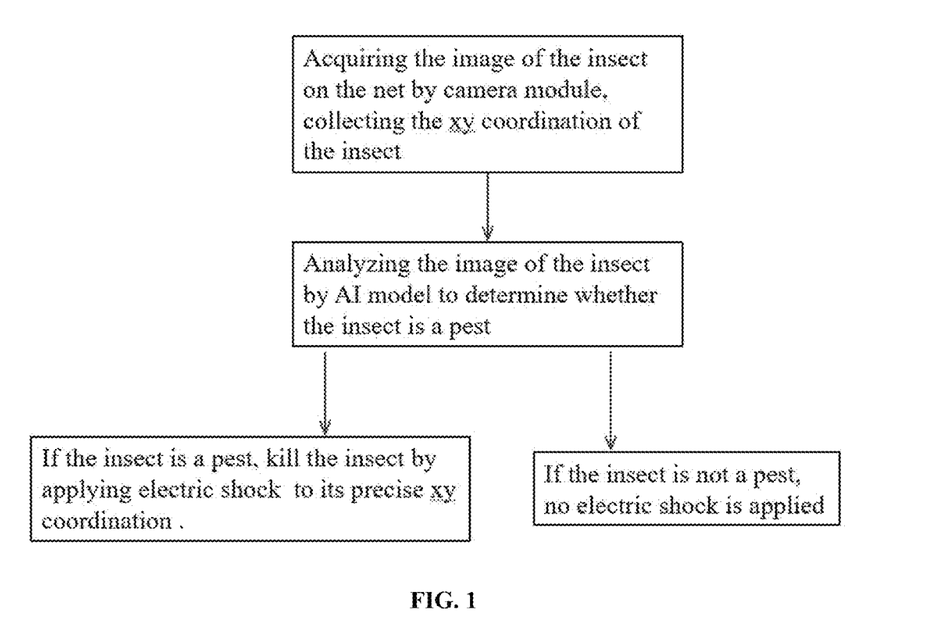
FIG. 1 shows a flow chart showing the identification mechanism and the elimination mechanism of the insect pest control device according to an embodiment of the invention.
Figure 2:
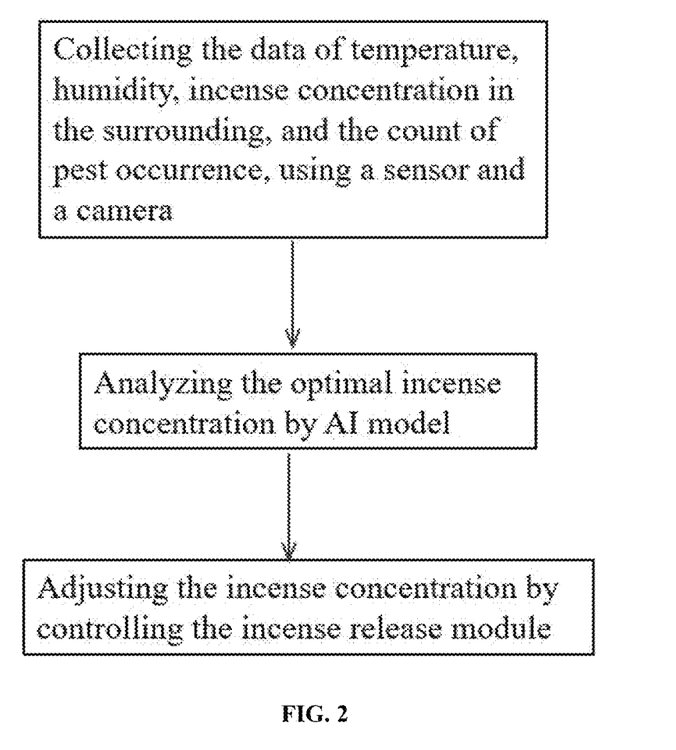
FIG. 2 shows a flow chart showing part of the control mechanism of the insect pest control device according to an embodiment of the invention.
Figure 3A:
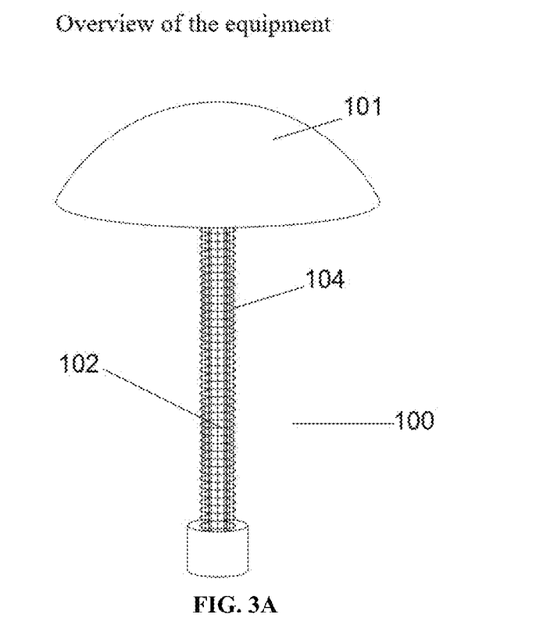
FIG. 3A shows an overview of the tree-shape structure of the insect pest control device according to an embodiment of the invention.

FIG. 3A shows an overview of the tree-shape structure of the insect pest control device according to an embodiment of the present disclosure. As can be seen from FIG. 3, the insect pest control device 100 may include: a canopy 101, a trunk 102, a trunk base 103, and an electric net 104, wherein the canopy 101 is linked at the top end of the trunk 102 and the trunk base 103 is linked at the base of the trunk 102, and the electric net 104 wraps around the trunk.

The insect pest control device has a tree-shape structure, which is configured for providing a canopy 101 is configured as a tall vertical structure to increase the attractivity to the spotted lanternfly. The electric net 104 is comprises multiple zones configured to release electric shock separately.

Figure 3B:
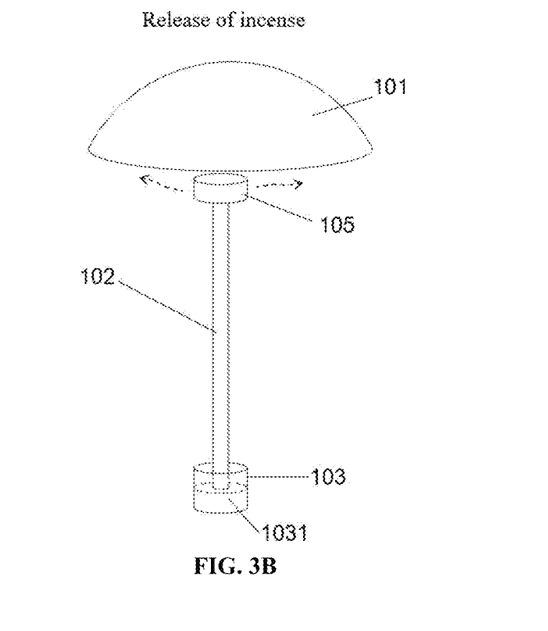
FIG. 3B shows a diagram showing the release pathway of incense in the insect pest control device according to an embodiment of the invention.

FIG. 3B shows a diagram showing the release pathway of incense in the insect pest control device according to an embodiment of the invention. The incense source 105 comprises the chemical/bio-attractant spray system and locates at the summit of the trunk 102, directly beneath the canopy's center. The chemical/bio-attractant spray system periodically releases incense, and after that the released incense spreads around the device to attract the spotted lanternflies.

Figure 4:
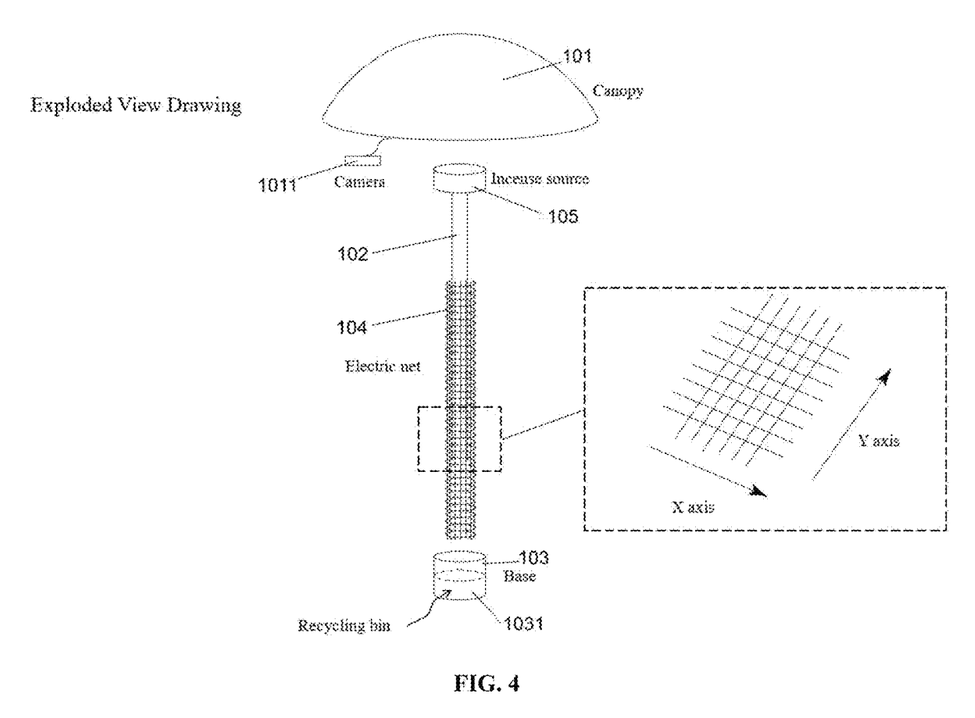
FIG. 4 shows an exploded view of the insect pest control device according to an embodiment of the invention.

FIG. 4 shows an exploded view of the insect pest control device according to an embodiment of the invention. The camera 1011 is of high-resolution, situated on the inner side of the canopy 101, and is configured to focus on the controlled zones around the tree-shape structure, especially zone around the trunk 102 and the electric net 104, and capture periodic images. Preferably, two cameras 1011 are situated on the inner side of the canopy 101, enabling the shooting range to cover all the controlled zone. The electric net 104 uses x and y axes to measure precise positions. Upon positive identification from the camera capture, electric shocks from the electric net 104 are precisely dispatched to designated areas of the net, resulting in instant neutralization of the targeted pest. A recycling bin 1031 is located at the trunk base 103 for collecting the deceased insects.

Figure 5:
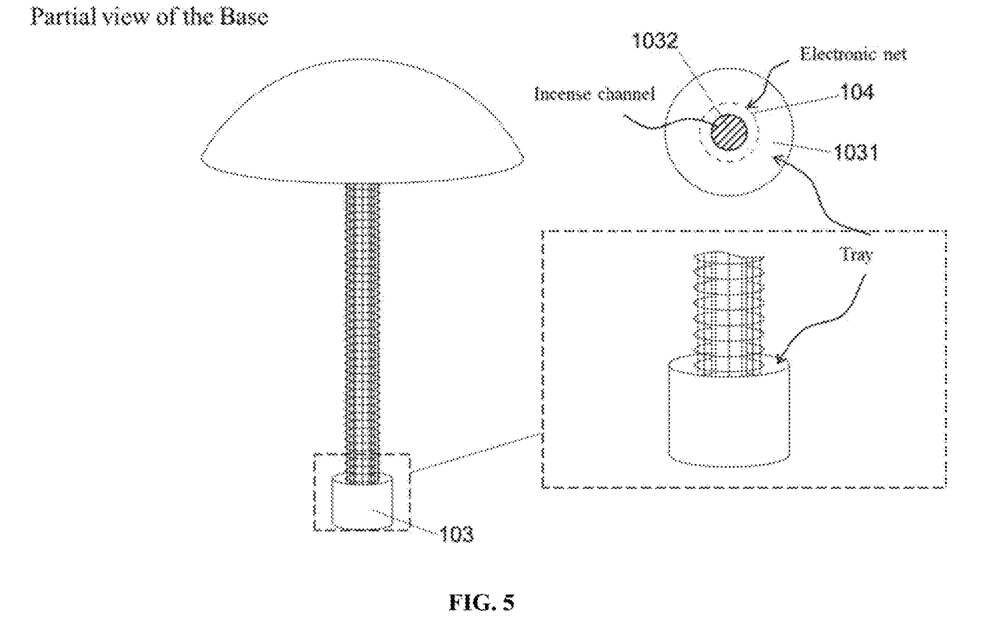
FIG. 5 shows an overview of the whole tree-shape structure, as well as a detailed view of the trunk base, of the insect pest control device according to an embodiment of the invention.

FIG. 5 shows an overview of the whole tree-shape structure, as well as a vertical view of the trunk 102 and a vertical view of the trunk base 103 of the insect pest control device according to an embodiment of the invention.

In the vertical view of the trunk base 103, a computer 1032 situates at the center, which is configured for processing data collected from the camera 1011 and sending instructions to the chemical/bio-attractant spray system of the incense source 105 for adjusting the incense releasing intensity, as well as sending instructions to the electric net 104 for dispatching electric shocks. In certain embodiments, the computer 1032 is a Raspberry Pi. The recycling bin 1031 is situated within the trunk base 103 and around the computer 1032, which is configured for collecting deceased insects produced by the insect pest control device 100. In certain embodiments, the lid of the recycling bin 1031 is controlled by an electric motor and opens at predetermined intervals.

Figure 6:
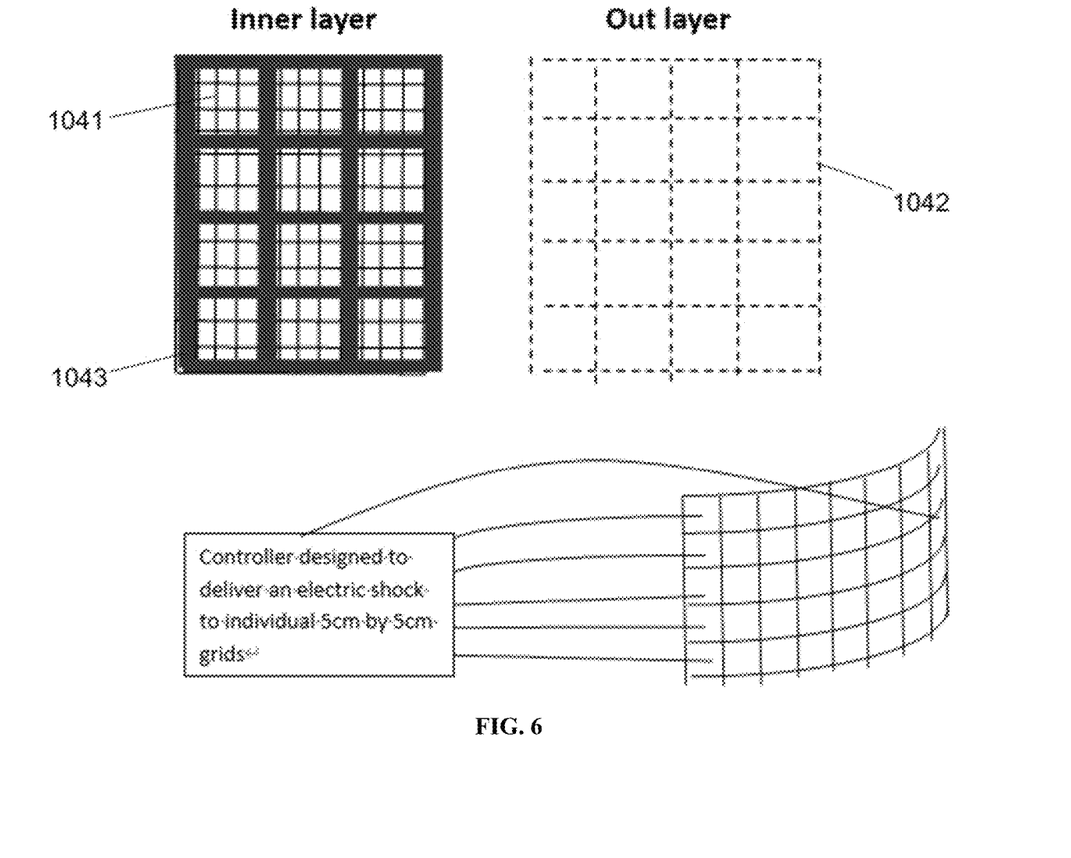
FIG. 6 shows an exemplary structure of the electric net.

FIG. 6 shows an exemplary structure of the electric net. The electric net is constructed with two distinct layers separated by 3 mm thick plastic strips 1043, which serve to insulate the inner layer 1041 from the outer layer 1042. The bold bars in the "Inner layer" part represent 3 mm thick plastic strips. The outer layer 1042 displays a less dense electric net, whereas the inner layer 1041 is segmented into 5 cm by 5 cm grids, each isolated from its neighbors. A high-voltage shock can be directed to a particular grid within the inner layer 1041. When a pest alights on this specified grid, its body or legs will bridge the outer layers and inner layers, resulting in the pest being electrocuted and killed. The entire net measures 60 cm×100 cm, composed of 12 by 20 grids, and is tailored to wrap around a trunk with a circumference of 20 cm.

Figure 7:
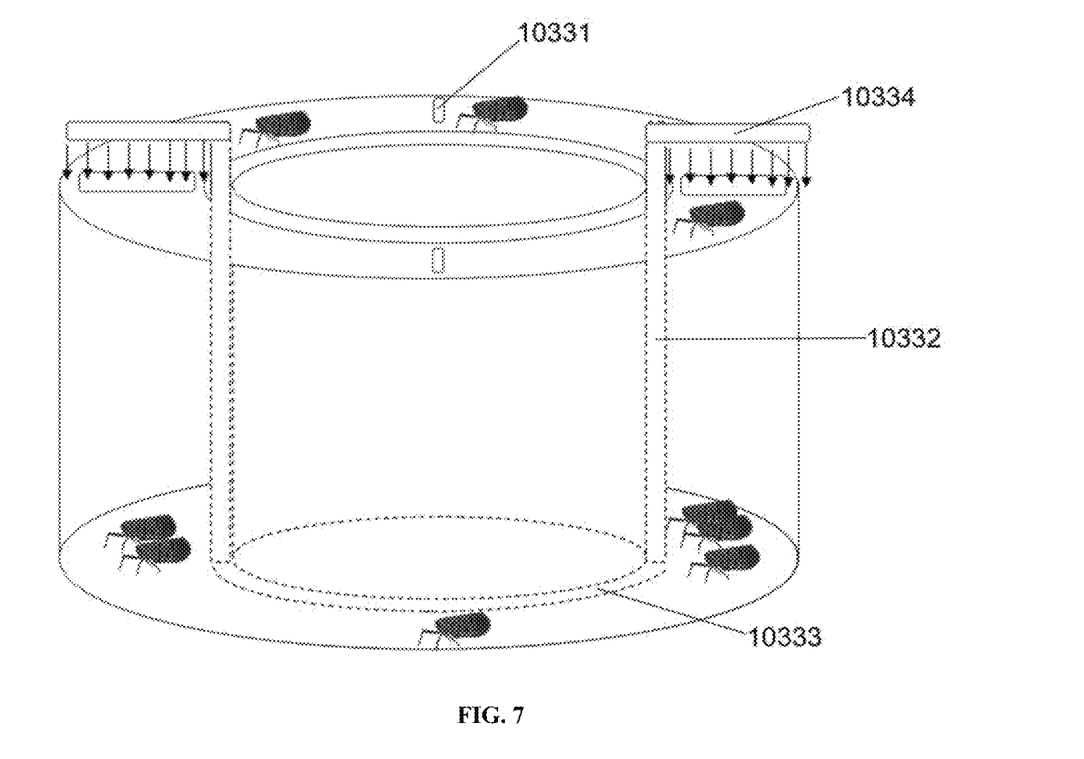
FIG. 7 shows an exemplary structure of the recycling system.

FIG. 7 shows an exemplary structure of the recycling system. The recycling system is designed as a hollow cylindrical structure positioned at the base of the trunk 102. The cover of the recycling bin boasts four rectangular openings 10311, spaced 90 degrees apart. Inside this structure, four rods 10312, anchored adjacent to each opening, are installed on a circular rail 10313 centered within the cylindrical structure. These rods 10332 are operated by servo motors. Each rod 10312 extends beyond the structure's cover and culminates in a brush 10314, parallel to the surface of the lid. Ordinarily, the brushes 10314 at the ends of the rods 10312 seal off these openings 10311. However, the servo motors can rotate the rods 10312, 90 degrees around the structure's center. As they turn, the brushes 10314 sweep any deceased pests off the lid, directing them through the openings and into the hollow bin beneath.

Method of Use

In another aspect, the present disclosure provides a method of using the insect pest control device described herein to control an insect pest. In one embodiment, the method comprises: obtaining the insect pest control device disclosed herein; detect presence of an insect pest at a specific zone of the electric netting; and releasing an electric shock at the specific zone to kill the insect pest.

EXAMPLE

This example illustrates the attractiveness of different plants to the spotted lanternfly (SLF).

Initial Experiment

Branches from the Tree of Heaven and 4 other trees were placed inside a sealed fish tank. Subsequently, 10 SLF nymphs were introduced at the tank's base.

After a duration of 12 hours, it was observed that 7 out of the 10 SLF nymphs were perched on the Tree of Heaven branches. By the 24-hour mark, 6 SLF nymphs remained on these branches. This experiment was replicated five times and it was consistently found that a statistically significant number of SLFs favored the Tree of Heaven branches. The results are shown in Table 1.

TABLE 1

Effects of branches from the Tree of Heaven and 4 other trees on attracting SLF nymphs

| | No. of plants | No. of SLF released | After 12 hours | After 24 hours |
|---|---|---|---|---|
| | 5 | 10 | 7 | 6 |
| | 5 | 10 | 5 | 6 |
| | 5 | 10 | 4 | 3 |
| | 5 | 10 | 5 | 5 |
| | 5 | 10 | 6 | 8 |
| Total | 5 | 50 | 27 | 32 |
| Average | | 10 | 5.4 | 6.4 |
| Stdev | | | 1.140 | 1.817 |
| t value | | | 6.668 | 5.416 |
| p value | | | 0.0013 | 0.0057 |

Field Test

Expanding the research to natural settings, Tree of Heaven branches were affixed to other trees. The outcomes were consistent with the results in Initial Example—SLFs demonstrated a clear attraction to the Tree of Heaven.

Tree of Heaven branches were positioned on a host tree, particularly where SLFs had been spotted in nearby areas or on the host tree itself. Notably, the initial placement spot on the host tree was devoid of any SLFs. Over time, an accumulation of SLFs on the Tree of Heaven branches were observed. Intriguingly, even the wilted leaves of the Tree of Heaven showed a remarkable attraction to SLFs. The results are shown in Table 2.

TABLE 2

Effects of the Tree of Heaven branches affixed to three host trees on attracting SLF nymphs

| Host Tree | Day 0 | Day 1 | Day 2 | Day 3 |
|---|---|---|---|---|
| Black Locust | 0 | 0 | 2 | 4 |
| Sumac | 0 | 4 | 12 | 6 |
| Japanese Snowbell | 0 | 2 | 5 | 7 |
| Japanese Snowbell | 0 | 5 | 4 | 6 |
| Japanese Snowbell | 0 | 2 | 7 | 11 |

Attractant Field Test

Building on the hypothesis that the scent of the Tree of Heaven lures in SLFs, the tree's leaves and branches were processed into a liquid extract, dubbing it "Tree of Heaven juice." When this juice was sprayed onto host tree branches, the same magnetic effect on the SLFs was observed. The results are shown in Table 3.

TABLE 3

Effects of the Tree of Heaven branches affixed to three host trees on attracting SLF nymphs

| Host Tree | Day 0 | Day 1 | Day 2 | Day 3 |
|---|---|---|---|---|
| Black Dye Tree | 0 | 0 | 2 | 1 |
| Sumac | 0 | 1 | 5 | 6 |
| Japanese Snowbell | 0 | 2 | 2 | 4 |
| Japanese Snowbell | 0 | 4 | 2 | 3 |
| Japanese Snowbell | 0 | 0 | 2 | 1 |

In view of the test results, the extract from the tree of heaven's leaves and branches can serve as an attractant for SLF within the insect pest control device of the present disclosure.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It may be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method of controlling spotted lanternflies, the method comprising:
    (a) installing an insect pest control device comprising:
        a tree-shaped structure comprising (i) a trunk (102) having a top end and a bottom end, wherein the trunk (102) has a length between the top end and the bottom end of around 1.5 meters, and (ii) a canopy (101) at the top end of the trunk (102),
        a spray (105) linked to the trunk (102) configured to release Tree of Heaven extract,
        an electric netting (104) wrapping around the trunk (102), wherein the electric netting (104) comprises multiple zones configured to release an electric shock separately,
        a vision sensor comprising (i) a camera and (ii) a processor configured to analyze images taken by the camera using a machine learning system, and
        a controller configured to control release of the electric shock at one specific zone of the multiple zones of the electric netting (104);
    (b) releasing the Tree of Heaven extract from the spray (105) to attract spotted lanternflies to the insect pest control device;
    (c) detecting a presence of an insect at a specific zone of the multiple zones of the electric netting (104) via the camera;
    (d) identifying the insect as a spotted lanternfly using the machine learning system; and
    (e) releasing, via the controller in response to the identification of the insect as the spotted lanternfly in step (d), an electric shock at the specific zone of the multiple zones of the electric netting (104) to kill the spotted lanternfly.

2. The method of claim 1, wherein the controller is installed inside the trunk.

3. The method of claim 1, wherein the insect pest control device further comprises a solar panel installed atop the canopy.

4. The method of claim 1, wherein the insect pest control device further comprises means configured to emit a light of specific frequency attracting the spotted lanternfly.

5. The method of claim 4, wherein the light is infrared.

6. The method of claim 1, wherein the insect pest control device further comprises means configured to emit ultrasonic waves to lure the spotted lanternfly.

7. The method of claim 1, wherein the insect pest control device further comprises a recycling bin situated at a base at the bottom end of the trunk which is configured to collect the spotted lanternfly being killed.

8. The method of claim 1, wherein the controller comprises a single-board computer.

\* \* \* \* \*